United States Patent [19]

Schäder

[11] 4,106,204

[45] Aug. 15, 1978

[54] DUAL READOUT DIAL-TYPE CALIPER

[75] Inventor: Karl Schäder, Niedernhall-Giebelheide, Fed. Rep. of Germany

[73] Assignee: Schneider & Kern, Niedernhall, Fed. Rep. of Germany

[21] Appl. No.: 803,418

[22] Filed: Jun. 3, 1977

[30] Foreign Application Priority Data

Jun. 10, 1976 [DE] Fed. Rep. of Germany ....... 2625976

[51] Int. Cl.² .......................... G01B 3/20; G01B 5/02
[52] U.S. Cl. ................................. 33/147 T; 33/143 J
[58] Field of Search ............. 33/125 R, 143 M, 143 J, 33/143 K, 147 R, 147 T, 147 J, 172 R

[56] References Cited

U.S. PATENT DOCUMENTS

| 1,281,715 | 10/1918 | Todt ..................................... 33/147 T |
| 2,898,684 | 8/1959 | Schneider ........................... 33/147 T |
| 3,261,101 | 7/1966 | Neumayer .......................... 33/143 M |

FOREIGN PATENT DOCUMENTS 747,600  12/1966  Canada .................................. 33/147 T Primary Examiner—Richard R. Stearns
Attorney, Agent, or Firm—Michael J. Striker

[57] ABSTRACT

A caliper has an elongated beam provided with at least one longitudinally extending rack. A slider displaceable longitudinally along the beam has a mechanism holder which is pivoted on the slider about a transverse pivot axis. An arbor is rotatable in journals formed in the front and rear sides of the mechanism holder about an arbor axis pivotal to and offset from the pivot axis. A pinion on the rear end of this arbor meshes with the rack so that displacement of the slider along the beam rotates the arbor. A scale carried on the slider cooperates with a pointer carried on the front end of the arbor for indicating the relative positions of the slider and the beam. A spring carried on the slider bears on the holder and urges the holder in a direction so as to force the pinion into good mesh with the rack. The arbor may be tubular and another arbor received inside it may have its own pinion meshing with its own rack on the beam and carrying at its front end another pointer so that the device can read out in both metric and standard systems.

19 Claims, 6 Drawing Figures

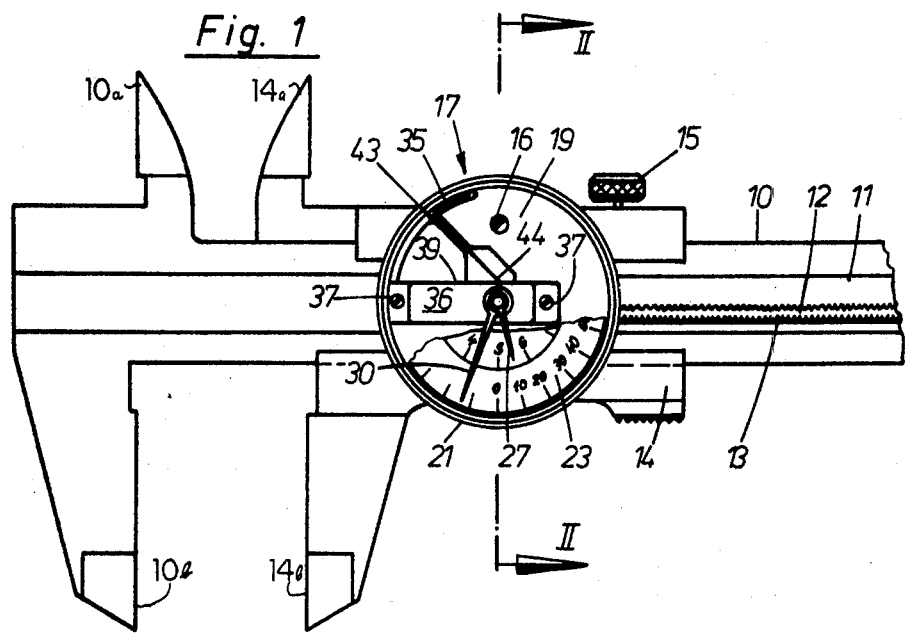
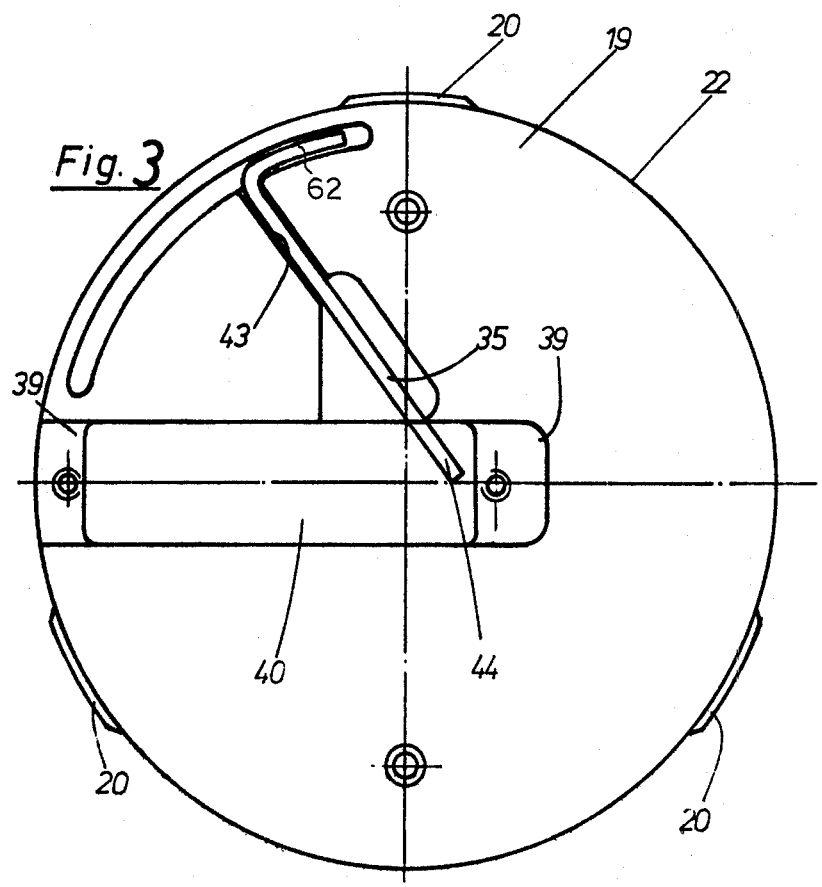

DUAL READOUT DIAL-TYPE CALIPER

BACKGROUND OF THE INVENTION

The present invention relates to a beam-type caliper. More particularly this invention concerns a dial caliper for standard (British or American) and metric readout.

A beam-type caliper generally has an elongated beam on which is displaceable a slider. A pinion carried on the slider is in constant mesh with the teeth of a rack extending longitudinally along the beam. An indicator is connected via an arbor to this pinion and reads out the spacing between a pair of jaws or fingers one of which is carried on the beam and the other of which is carried on the slider.

In one such arrangement the indicator is constituted as an odometer-type counter having an input gear or sprocket which constitutes the pinion that meshes with the rack. The entire counter is pivotal on the slider and a relatively stiff leaf spring is provided to pivotally bias the entire counter in a direction to force the input sprocket thereof into tight mesh with the rack. As the counter is a relatively massive unit it is essential that the spring force be relatively great so that the slider cannot easily slide along the beam. Furthermore the likelihood of the sprocket or pinion damaging the teeth of the rack is greatly increased if the spring force is decreased so as to protect the relatively fine and delicate teeth of the rack. A shock might disengage the pinion from the rack and therefore cause the counter to give an incorrect reading as to the relative positions of the jaws of the caliper. It is therefore necessary in such an arrangement carefully to construct the spring so that the spring force is not so great as to damage the teeth but not so light as to allow the pinions to come out of engagement with these teeth. One advantage must be traded off against another so that rarely is a satisfactory system obtained.

Another disadvantage of this known system is that it is necessary to replace the entire counter mechanism when the pinion thereof becomes worn. Even though a caliper is extremely carefully machined so that its various parts are of highly expensive construction, it is normally not economically justifiable in such an arrangement to replace the counter. Furthermore the journalling of the shaft or arbor carrying the pinion is often inadequate so that is is subjected to excessive bending forces and therefore frequently wears and works loose.

The above-described difficulties are compounded in a dial-type caliper having more than one readout, as for standard (British or American) and metric units of length. In such an arrangement the ardor for the pinion is typically journalled directly in the housing of the dial. It is therefore necessary very carefully to machine the seat for the arbor of the pinion. Once again biasing means is necessary to urge the pinion into the rack with a force which is great enough to prevent slippage of the pinion relative to the rack but not so great as to damage either of these elements. This, therefore, requires extremely careful and expensive machining. Furthermore once the device is somewhat worn whatever carefully set biasing force was originally present will be lost. In another known arrangement a spring is provided having a forked end each of whose sides is formed with a respective semi-cylindrical cutout. This forked end embraces the arbor of the pinion and biases it against the rack. Once again this arrangement requires extremely careful establishing of the spring force with the concomitant expensive production of the biasing parts. Nonetheless the biasing is effective over an extremely narrow area at only one location on the pinion so that wear is likely and the system therefore has a short service life. Furthermore once the journal is worn it is necessary to exchange almost the entire dial assembly, thereby greatly increasing the repair cost of such a caliper.

SUMMARY OF THE INVENTION

It is therefore an object of the present invention to provide an improved caliper.

Another object is to provide an improved dial-type caliper with a dual readout.

A further object is to provide a caliper whose parts likely to wear can readily be replaced at low cost.

These objects are attained according to the present invention in a caliper of the above-described general type which is provided with a mechanism holder that is pivoted on the slider about a transverse pivot axis and which has front and rear sides forming respective front and rear journals together defining an arbor axis generally parallel to and offset from the pivot axis. An arbor having a front end carrying a pointer and a rear end carrying a pinion is rotatable in the journals about the arbor axis. A spring is provided which is connected to the slider of the caliper and which bears on the holder so as to urge it pivotally in a direction pressing the pinion into tight mesh with the rack. The dial indicator of the device includes a back plate formed with a throughgoing mounting hole at least partially receiving the mechanism holder and with a recess that receives a mounting plate carrying a pin defining the pivot axis for the mechanism holder. The journals both lie between the pinion and the pointer and the back plate of the indicator is formed with a thoughgoing arbor hole spacedly receiving the arbor. The spring means itself is an elongated spring wire having one end received in the back plate and another end bearing on the holder.

Both the back plate and the mounting plate are formed with holes spacedly receiving the arbor so that limited pivoting of the mechanism holder with the arbor to urge the pinion into good mesh with the rack is not interfered with by the relatively fixed mounting plate and back plate of the slider. With this system the arbor is therefore secured at two separate axially spaced-apart journals so that it is very accurately guided and unlikely to tip. The biasing spring, which is formed as a spring wire having one end received in a groove extending generally radially of the arbor axis and another end bearing generally radially on the holder adjacent the arbor axis serves exclusively to bias the pinion into engagement with the rack. It does not serve as in the prior-art devices to axially position the arbor. Furthermore since the holder is a relatively light unit, the spring force can be correspondingly small in order that wear of the pinion and rack is minimized. This relatively light holder also reduces the likelihood of the pinion pulling out of engagement with the rack should the caliper be dropped, as the inertia of the holder is quite small.

Another advantage of the above-described inventive system is that it is a relatively simple matter to change the wear-prone mechanism of the caliper. The holder, mounting plate, pinion and arbor can be easily removed as a single unit and replaced with a new such unit. Thus repair and initial construction costs are reduced greatly.

In accordance with further features of this invention the back plate is made of synthetic-resin material and the mounting plate and holder are of metal. Furthermore the mounting plate has a front side turned away from the holder and formed with a throughgoing hole through which the arbor passes and formed around this hole with an annular extension or collar that projects into the arbor hole. The scale is a scale plate or disc that is rotatable on this annular extension or collar about the arbor axis. Thus zero adjustment of the device is a relatively simple matter, effected by turning the scale plate on the extension of the back plate.

In accordance with further features of this invention the holder is formed as a back plate and a front plate is axially spaced therefrom by means of radially spaced spacers. The two plates are elongated and have center lines which extend through the journals. The pivot axis is, however, offset from these center lines and is defined by a pin fixed in and extending from the mounting plate and having a head bearing against the back side of the back plate. Such a box-type construction is extremely rigid and assures perfect parallelism between the pivot axis and the axis of the arbor.

The caliper according to this invention may be of the dual-readout type. To this end the beam is provided with the second rack adjacent the first-mentioned rack and of a different tooth spacing as the first-mentioned rack. A second arbor is provided which extends coaxially through the first-mentioned arbor that according to this invention is tubular. The rear end of the second arbor carries a second pinion that meshes with the second rack and the front end of the second arbon carries a second pointer which lies adjacent the first-mentioned pointer. Appropriate scales are provided for each of these pointers, one normally reading in millimeters and the other in inches. According to this invention the beam is provided with a longitudinally extending groove the base of which is adhesively secured to the first rack and, on top of this first rack, the second rack is adhesively secured. The two pinions are radially spaced and a spring strip has one end fixed to the rear plate of the holder and another end formed with a semi-cylindrical cutout and bearing radially against the inner or second arbor in the same direction that the main spring urges the entire holder relative to the slider.

A particular advantage of this last-mentioned feature is that it is possible relatively easily to exchange the single-pointer dial assembly for a dual-pointer dial assembly and vice versa. The basic beam can be provided in all instances with the two racks, so that thereafter the user, without great difficulty, can convert the system from single to dual readout or vice versa. Furthermore the use of a separate biasing spring bearing on the rear end of the inner arbor insures exact biasing of the respective second pinion into the second rack. This last-mentioned spring also serves to axially guide the second arbor relative to the first outer arbor and thereby determine a carefully controlled axial position for this inner arbor. This spring is formed of a beryllium alloy so that the spring itself will not bite into the inner arbor.

Furthermore as mentioned above the two racks are adhesively secured inside the groove of the beam. This reduces construction costs, as the rack is normally either formed as part of the beam or secured by screws to the beam. Such adhesive mounting is possible according to this invention due to the easily controlled force with which the pinion will bear on the rack.

Finally in accordance with this invention the scale is formed as a disc journalled as described above on the extension of the back plate of the dial assembly. This disc is mounted in a ring that is rotatable about the back plate. A screw having an eccentric head serves rotationally to fix the ring and the scale so that once the arrangement is adjusted to zero it can be locked in place. This particular arrangement makes adjustment of the device very simple and at the same time reduces construction costs. The back plate may be formed with radially extending ridges extending in a groove in the above-mentioned ring. In fact the ring may be formed with a bayonette-type coupling terminating in the groove, since the ring need only be moved through a small arc for adjustment, so that rotation through a much greater arc could be used to align notches on the back of the ring with the ridges on the back plate to allow the ring to be removed. A transparent glass is provided in the front of the ring to protect the pointers and the scale indicia on the scale plate.

The novel features which are considered as characteristic for the invention are set forth in particular in the appended claims. The invention itself, however, both as to its construction and its method of operation, together with additional objects and advantages thereof, will be best understood from the following description of specific embodiment when read in connection with the accompanying drawings.

BRIEF DESCRIPTION OF THE DRAWINGS:

FIG. 1 is a side view partly broken away of a caliper according to this invention;

FIG. 3 is a front view of a detail of the dial assembly of the caliper shown in FIG. 1;

Figure 2:
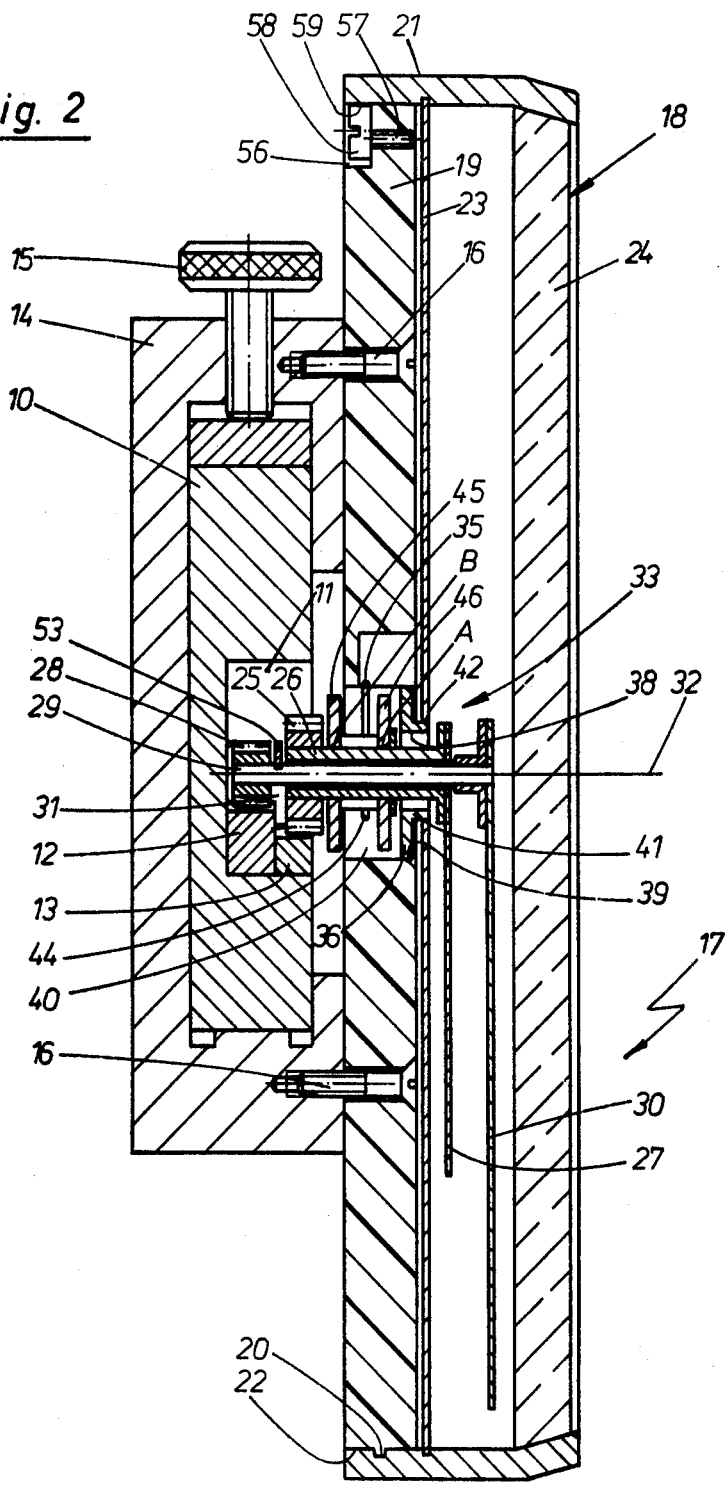
FIG. 2 is a large-scale section taken along line II—II of FIG. 1.
Figure 4:
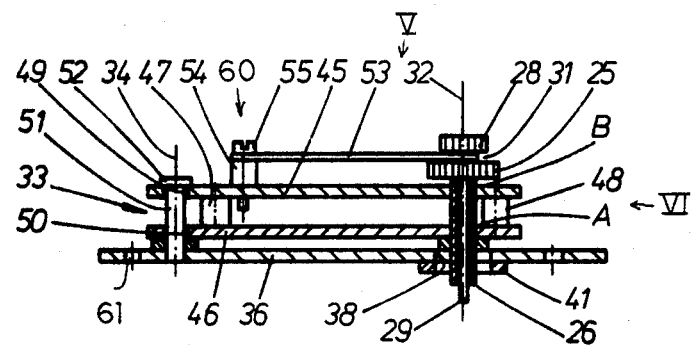
FIG. 4 is a section through the mechanism of the caliper.
Figure 5:
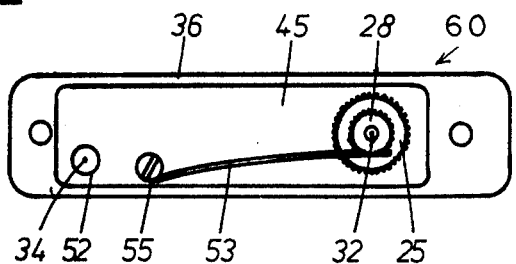
FIGS. 5 and 6 are views taken in the direction of arrows V and VI, respectively, of FIG. 4.
Figure 6:
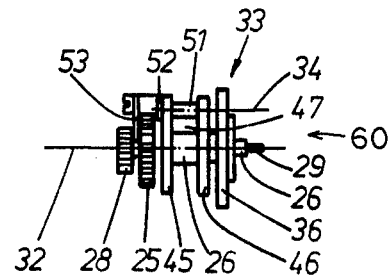

DESCRIPTION OF A PREFERRED EMBODIMENT:

As shown in FIG. 1 a caliper according to this invention basically comprises a beam 10 on which is longitudinally displaceable a slide 14 carrying an indicator or a dial assembly 17. The beam 10 is formed at one end with inside and outside fingers or jaws 10a and 10b respectively and the slider 14 is similarly provided with inside and outside fingers or jaws 14a and 14b respectively. The slider 14 can be locked on the beam 10 by means of a transversely extending locking screw 15.

As best shown in FIG. 2 the beam 10 is formed with a longitudinally extending rectangular-section groove 11 into the base of which is adhesively fixed an inch rack 12. A millimeter rack 13 is adhesively secured to the inch rack 12 and to the side of the groove 11. The two racks 12 and 13 extend exactly parallel to each other and to the direction of displacement of the slide 14 along the beam 10. The rack 13 is narrower than the rack 12 so that its row of teeth is transversely offset to but parallel to the teeth of the rack 12.

The indicator assembly 17 basically comprises a housing 18 having a circular synthetic-resin back plate 19 secured by means of screws 16 to the slider 14. The plate 19 is formed at its outer edge 22 with three angularly equispaced and radially extending ridges 20 that engage in a corresponding continuous and inwardly open circumferential groove formed in an annular rim 21 that constitutes the lateral wall of the housing 18. A transparent cover glass 24 is fixed within the front face of this rim 21 and a circular scale plate 23 is also secured to the rim 21. Thus the rim 21 can rotate on the back plate 19. A screw 57 has an eccentric head 58 received in a recess 56 on the back of the plate 19. Rotation of this screw 57 allows the head to bear radially tightly against the inner surface 59 of the rim 21 so as to lock the rim 21 in place on the backing plate 19.

The dial assembly 17 is provided with mechanism 60 basically constituted as a thin support plate 36 on which is pivotal a holder 33. The plate 36 is formed with two throughgoing holes 61 intended to receive screws 37 (FIG. 1) that secure this plate 36 at recesses 39 to either side of a hole 40 extending through the plate 19.

The holder 33 is basically formed with two parallel metal plates 45 and 46 of generally rectangular shape and spaced apart rigidly by a pair of spacers 47 and 48. A pin 51 extends through holes 49 and 50 in the plates 45 and 46 and is seated in the plate 36 so as to define a pivot axis 34 for the holder 33. This pin 51 has a head 52 that prevents the holder 33 from slipping axially off the pin 51.

The holder 33 journals a pair of coaxial arbors 26 and 29, the former of which is hollow so as loosely to receive the latter for rotation of both of these arbors 26 and 29 about an axis 32 parallel to but offset from the axis 34. The inner arbor 29 is provided on its rear end with a pinion 28 meshing with the inch rack 12 and on its front end with a pointer 30 that cooperates with an inch scale on the disc 23. The outer tubular arbor 26 is provided on its rear end with a pinion 25 meshing with the millimeter rack 13 and of greater diameter than the pinion 28 and on its front end with a relatively short pointer 27 cooperating with a millimeter scale on the disc 23. The pinions 25 and 28 are spaced axially apart by a distance or gap 31.

The inner arbor 29 is journalled in the outer arbor 26 and the outer arbor 26 is journalled in the plates 45 and 46 at A and B respectively. The plate 36 is formed with a relatively large throughgoing hole 38 through which the two arbors 26 and 29 pass with considerable clearance and is provided around this hole 38 with an extension 41. In addition the scale disc 23 is formed with a central relatively large throughgoing hole 42 through which the front ends of the two arbors 26 and 29 pass.

A relatively fine and highly elastic beryllium alloy spring wire 53 has one end bearing on the arbor 29 between the pinions 25 and 28 and another end secured between a screw 55 and a spacer 54 at a location adjacent the axis 34. This spring 53 is prestressed so as to urge the rear ends of the two arbors 26 and 29 radially relative to the axis 32 toward the racks 12 and 13 and to urge the pinions 25 and 28 into mesh with the racks 13 and 12, respectively. The spring 53 is of rectangular cross-section with its narrow side bearing on the arbor 29. The end of the spring 53 engaging the arbor 29 is formed with a semi-cylindrical cutout that exactly fits the arbor 29. The arbor 29 is snugly received within the arbor 26 so that the radial urging effected by the spring 53 is also effective on the outer arbor 26.

A spring 35 has a bent end 62 received in a slot 43 formed in the plate 19 and has a free end 44 bearing on the spacer 48 extending between the plates 45 and 46 remote from the axis 34. Thus whereas the spring 53 serves mainly to hold the mechanism together, the spring 35 urges the entire holder 33 for rotation about the axis 34 in such a manner that the pinions 25 and 28 are biased radially relative to the axis 32 into mesh with the racks 13 and 12, respectively. Thus the force with which the pinions 25 and 28 are urged into mesh with the racks 13 and 12 is determined almost exclusively by the spring force of this spring 35. The limited pivoting of the holder 33 about the axis 34 is facilitated by the spacing between the outer arbor 26 and the hole 38 in the plate 36 and the hole 42 in the plate 23. In fact the extension 41 extends through the plate 23 at the hole 42 so that very secure mounting of the mechanism 60 in the dial assembly 17 is assured, while the necessary limited radial displacement of the pinions 25 and 28 insures that they will always be in excellent tight mesh with the racks 13 and 12. The slight radial displacement of the axis 32 relative to the scale plate 23 is so small as not to effect accurate reading of the positions of the inch and millimeter pointers 30 and 27, respectively, on the outer and inner scales on the plate 23.

With the assembly according to the present invention very accurate reading of the caliper is insured. At the same time the arrangement is of relatively simple and inexpensive construction. Exchange of the mechanism 60 for a new or rebuilt mechanism is an extremely simple matter, merely requiring removal of the rim 21 with the discs 23 and 24 by means of a bayonette coupling constituted in part by the ridges 20, and withdrawal of the two screws 37 that hold the entire mechanism 60 in place.

It will be understood that each of the elements described above, or two or more together, may also find a useful application in other types of measuring devices, differing from the types described above.

While the invention has been illustrated and described as embodied in a caliper, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic of specific aspects of this invention.

What is claimed as new and desired to be protected by Letters Patent is set forth in the appended claims.

1. A caliper comprising:
   an elongated beam provided with at least one longitudinally extending rack;
   a slider displaceable longitudinally along said beam;
   a mechanism holder pivoted on said slider about a transverse pivot axis and having front and rear sides forming respective front and rear journals together defining an arbor axis generally parallel to and offset from said pivot axis;
   an arbor rotatable in said journals about said arbor axis and having front and rear ends projecting respectively from said front and rear sides of said holder;
   a pinion on said rear end meshing with said rack, whereby displacement of said slider along said beam rotates said arbor;
   indicator means including a scale carried on said slider and a pointer on said front end of said arbor for indicating the relative positions of said slider and said beam;

spring means connected to said slider and bearing on said holder for urging same pivotally in a direction pressing said pinion into tight mesh with said rack; and a mounting plate carrying a pin defining said pivot axis, said indicator means including a back plate formed with a throughgoing mounting hole at least partially receiving said holder and with a recess adjacent said mounting hold and receiving said mounting plate.

2. The caliper defined in claim 1, wherein said journals both lie between said pinion and said pointer.

3. The caliper defined in claim 2, said mounting hole spacedly receiving said arbor, and said spring means including an elongated spring wire having one end received in said back plate and another end bearing on said holder.

4. The caliper defined in claim 3, wherein said back plate is of synthetic-resin material and said mounting plate and holder are of metal.

5. The caliper defined in claim 3, wherein said mounting plate has a front side opposite said holder and formed with a throughgoing hole through which said arbor passes and having an annular extension, said scale being a scale plate rotatable on said annular extension about said arbor axis.

6. The caliper defined in claim 3, wherein said back plate is formed with a groove extending generally radially of said arbor axis and receiving said spring wire, said spring wire bearing on said holder adjacent said arbor axis.

7. The caliper defined in claim 3, wherein said holder has front and rear plates forming said front and back sides respectively and respectively forming said front and rear journals.

8. The caliper defined in claim 7, wherein said holder includes spacers extending axially between said front and rear plates.

9. The caliper defined in claim 7, wherein said plates are elongated and have centerlines, said arbor axis lying generally on said centerlines and said pivot axis being offset therefrom.

10. The caliper defined in claim 7, wherein said pin is fixed in said mounting plate and has a head lying against said back side of said holder.

11. The caliper defined in claim 3; further comprising a second rack on said beam adjacent the first-mentioned rack and of different tooth spacing from said first rack, said arbor being tubular; a second arbor extending coaxially through and journalled in the first-mentioned arbor and having respective front and rear ends; a second pinion carried on said rear end of said second arbor and meshing with said second rack adjacent the first-mentioned pinion, said pinions being axially spaced; and a second pointer carried on said front end of said second arbor adjacent the first-mentioned pointer.

12. The caliper defined in claim 11; further comprising a spring strip carried by said holder and bearing radially on said second arbor to prevent axial displacement of said second arbor.

13. The caliper defined in claim 12, wherein said spring strip bears radially on said second arbor between said first and second pinions.

14. The caliper defined in claim 12, wherein said spring strip has an end formed with a semicylindrical cutout bearing on said second arbor.

15. The caliper defined in claim 12, wherein said spring strip has an end fixed on said rear side of said holder.

16. The caliper defined in claim 12, wherein said spring strip is of a beryllium alloy.

17. The caliper defined in claim 11, wherein said beam is formed with a longitudinally extending groove and said first rack is adhesively secured to said groove.

18. The caliper defined in claim 17, wherein said second rack is adhesively secured to said first rack.

19. The caliper defined in claim 3, wherein said back plate is a substantially circular disc, said indicator means including a ring surrounding said disc and rotatable thereon about said arbor axis; a scale disc secured to said disc and carrying said scale; and a locking screw threaded into said back plate and having an eccentric head radially engageable with said ring to lock same from rotation relative to said disc.

* * * * *